United States Patent Office 2,695,247
Patented Nov. 23, 1954

2,695,247

PRODUCTION OF TRANSPARENT ELECTRO-CONDUCTIVE ARTICLE

Albert E. Junge, New Kensington, Pa., assignor to Pittsburgh Plate Glass Company, Allegheny County, Pa., a corporation of Pennsylvania No Drawing. Application March 5, 1952,
Serial No. 275,015

5 Claims. (Cl. 117—54)

This invention relates to the production of transparent films or coatings upon lime soda glass and it has particular relation to a novel method of producing such films or coatings upon lime soda by mass production free from haze or like optical defects.

It is known that transparent films may be deposited upon glass by heating the glass to a temperature of 500 to 1250° F. and spraying the heated glass base such as lime soda glass, with stannic chloride. Further research has led to the discovery that by use of proper precautions and special solutions, transparent films can be obtained which have unusually low electrical resistance. Thus it has been found that the use of certain agents such as methanol or phenyl hydrazine hydrochloride in conjunction with stannic chloride produces a transparent coating which has a resistance in terms of ohms per unit square below 500 and generally below 150.

Such low electrical resistance has made possible the provision of viewing closures in the cabins of automotive vehicles such as aircraft and automobiles which have a transparent surface and which may be electrically heated in a convenient manner. The provision of such an article affords a convenient means of preventing accumulation of fog, ice or snow upon the viewing closure, simply by electrically heating the glass, using the transparent films as resistance element.

Despite the fact that the above process permits production on a large scale of viewing closures having conductive films with electrical resistance below 500 ohms per unit square, a portion of products thus produced have been defective due to the presence of haze in the film. This haze sometimes has developed in localized areas of the glass sheet and at other times, the entire surface of certain articles has been found to be hazy. In consequence, an undue number of glass panels have been rejected as unsuitable for use as viewing closures. Losses due to these "rejects" have very materially increased the cost of suitable viewing closures.

The present invention provides a convenient method whereby much of the haze in glass panels of the type described may be eliminated and the number of panels rejected due to the presence of haze or other unsightly defect may be substantially reduced. It has been found that haze and similar defects may be eliminated at least to an appreciable degree by reducing the alkali metal content of the surface to be coated prior to application of the transparent electroconductive coating. This may be accomplished by establishing an intermediate film, layer or zone which is free of alkali or at least is lower in removable alkali content than the glass surface, between the glass and the electroconductive metal coating. According to the present invention, this may be accomplished by treating the glass surface while the glass is at a temperature of above about 500° F. but below the temperature at which the base melts with a hydrofluosilicic acid solution prior to application or formation of the transparent film.

The use of a spray of $H_2SiF_6$ prior to application of the transparent electroconductive film provides good contact between bus bars and the electroconductive film in addition to enabling the production of haze free films. When a silver ceramic bus bar is applied to a glass base and a tin oxide transparent electroconductive coating thereafter applied, the silver bus bar has a certain repulsion for the tin coating and little or no tin oxide tends to deposit immediately adjacent the bus bar. Hence good contact and bonding between the bus bar and the film or coating is not obtained.

One method which has been employed to overcome this repulsion is to place a narrow strip of gold or platinum along the edge of the bus bar in order to achieve good electrical connection between the film and the bus bar. It has been found that spraying the base containing the silver bus bar with $H_2SiF_6$ prior to application of the tin oxide film, eliminates the repulsion of the silver for the tin and that the gold or platinum strip is then no longer required.

The following examples are illustrative of the manner in which the invention may be practiced:

Example I

A piece of lime soda glass 12 inches x 12 inches x ¼ inch was provided with a pair of ceramic metal bus bars deposited along opposing edges of the glass. The ceramic metal bus bars are prepared using a composition comprising a highly conductive silver powder and a vitrifying binder. The ingredients forming the vitrifying binder, litharge, boric acid, and silica, were heated to 1700° F. to fuse the binder and to form a glass-like mass. This mass was then converted into a frit by grinding in a ball mill. Powdered silver was then added to this frit and screening vehicles. French fat oil, turpentine and ethyl alcohol, were added to the composition to facilitate its application.

The glass thus provided with metal bus bars was then placed in a furnace and heated at a temperature of 1050° F. for 3 minutes. The heated glass was then removed from the furnace and sprayed with 10 cubic centimeters of a solution made up of 300 cubic centimeters of an aqueous solution of $H_2SiF_6$ containing about 30 per cent by weight of $H_2SiF_6$ in 700 cubic centimeters of acetone. Immediately after this prespraying with hydrofluosilicic acid, the base, while still at a temperature approximating 1050° F. was sprayed with 10 cubic centimeters of a solution composed of the following ingredients:

| | | |
|---|---|---|
| Stannic chloride | grams | 20,430 |
| Phenyl hydrazine hydrochloride | do | 639 |
| An aqueous solution of hydrofluoric acid containing about 48% by weight of hydrofluoric acid | grams | 134 |
| Distilled water | milliliters | 7,056 |
| Dioctyl sodium sulphosuccinate solution | do | 918 |
| Methanol | do | 2,250 |

A clear transparent electroconductive tin oxide film, free from haze, was obtained. The film had a resistance of 50 ohms per unit square and an average thickness of about 80 millimicrons.

The prespray solution comprises $H_2SiF_6$ and may or may not contain other ingredients such as an aliphatic alcohol and/or ketone containing up to 5 carbon atoms, for example, methyl alcohol, ethyl alcohol, acetone, etc. The amount of $H_2SiF_6$ in the spraying solution varies from about 5 per cent by weight to 30 per cent by weight. Aqueous solutions of $H_2SiF_6$ containing from 5 to 30 by weight of $H_2SiF_6$ are suitable for practice of the invention.

The amount of $H_2SiF_6$ which may be applied to the glass base may be varied considerably without impairing the resistivity and optical properties of the coated base. If too large an amount of $H_2SiF_6$ solution is applied to the glass base, the base may be cooled below the temperature at which the transparent electroconductive film is formed. This necessitates a reheating of the base which may be undesirable or at least uneconomical.

Example II

The following experiment was performed to test the effect of the amount of $H_2SiF_6$ prespay solution upon the transparent electroconductive film applied thereafter:

Seven pieces of lime soda plate glass 12 inches x 12 inches x ¼ inch were placed in a furnace and heated at a furnace temperature of 1050° F. for about three minutes. One of the pieces was sprayed immediately with 10 cubic centimeters of the film forming solution described above. The others were sprayed with varying amounts of a solution made up of 700 cubic centimeters of methyl alcohol and 300 cubic centimeters of an aqueous solution of $H_2SiF_6$ containing 30 per cent by weight of $H_2SiF_6$.

After being sprayed with the $H_2SiF_6$ solution, the six glass sheets were again heated in a furnace at a furnace temperature of about 1050° F. for 3 minutes and immediately thereafter sprayed with about 10 cubic centimeters of the stannic chloride solution described in Example 1. The resistivity of the transparent electroconductive film thus formed was measured and the results are listed below:

| $H_2SiF_6$ (Cubic Centimeters) | Stannic Chloride Solution (Cubic Centimeters) | Average Resistivity (Ohms) |
|---|---|---|
| 0 | 10 | 50 |
| 3 | 10 | 50 |
| 6 | 10 | 50 |
| 9 | 10 | 50 |
| 10 | 10 | 50 |
| 15 | 10 | 50 |
| 20 | 10 | 50 |

When a tin compound, such as stannic chloride, is used as the coating material, the process produces a transparent electroconductive film which largely comprises an oxide of tin. Such films are at least 95 to 99 per cent tin oxide and contain certain impurities such as chlorine, carbon and silica, together with some amount of elemental tin.

In depositing films upon soda lime glass, it has been found that certain agents, notably methanol and phenyl hydrazine hydrochloride or antimony chloride, materially improve the coating particularly as to its electroconductivity. A wide variety of other agents of this character may be used such as those described in an application of W. O. Lytle for U. S. Letters Patent, Serial No. 762,658, filed July 22, 1947, and now Patent No. 2,614,944. The amount of the addition agent which is used is capable of substantial variation depending upon the result desired. Small amounts (even traces) show an improvement in the conductivity and freedom from haze of the film and such improvement increases to a maximum as the amount of addition agent is increased. In general, the amount of such agent which is used in conjunction with the tin compound is at least 0.01 to 0.1 mole per mole of tin compound.

The invention has been described with special reference to the use of stannic chloride as the tin compound for production of the electroconductive film. This compound is particularly valuable since it may be used either in aqueous medium or in vapor state to produce films which visibly appear to be flawless. Other stannic compounds which are decomposable such as stannic bromide, $SnBr_3Cl$, $SnBrCl_3$, $SnCl_2I_2$, $SnI_4$, stannic sulphate, stannic phosphate, stannic nitrate or stannous salts such as stannous acetate, stannous oxalate, stannous chloride, stannous nitrate, stannous tartarate may be used.

According to a further embodiment mixed oxides may be applied. For example, an aqueous solution containing the usual amount of stannic chloride or other tin compound may have dissolved therein or mixed therewith, usually in small amount, compounds of other metals such as indium chloride, zinc bromide, zinc acetate, thallium nitrate, chromium chloride, ferric chloride or other compounds of these metals to modify the properties of the film.

Since the haze which is avoided by recourse to this invention is created largely by sodium, the invention is applicable to provision of electroconductive coatings upon various types of glass having a high content of sodium. These glasses have the general composition:

| | Percent by weight |
|---|---|
| Alkali metal oxide, such as $Na_2O$ and/or $K_2O$. | 10 to 35 percent by weight. |
| Alkaline earth metal oxide, such as CaO, and/or MgO. | 5 to 25 percent by weight, the CaO content being not less than 5 percent by weight. |
| $SiO_2$ | 50 to 75 percent by weight. |
| $Al_2O_3$ | 0 to 20 percent by weight. |

It will be understood that various other materials, usually in small amount (1 to 5 per cent by weight or less), also may be present. Such materials include arsenic, antimony, fluorine, lithium, barium, zinc, titanium, $B_2O_3$, iron, cobalt, nickel, lead, phosphate, and the like.

As previously stated, the invention has been found to be especially valuable when used in the coating of window and plate glass which are made of lime-soda glass. Such glass usually has the following composition:

| | |
|---|---|
| Alkali metal oxide, such as $Na_2O$, and/or $K_2O$. | 10 to 18 percent by weight. |
| Alkaline earth metal oxide, such as CaO, and/or MgO. | 5 to 16 percent by weight, the CaO content being at least 5 percent by weight. |
| $SiO_2$ | 65 to 75 percent by weight. |
| $Al_2O_3$ | 0 to 5 percent by weight. |

A typical lime soda glass used as window glass has the following composition:

$SiO_4$, 71.38 percent by weight (usual variation 71 to 73% by weight)
$Na_2O$, 12.79 per cent by weight (usual variation 12 to 14% by weight)
CaO, 9.67 percent by weight (usual variation 8 to 11% by weight)
MgO, 4.33 percent by weight
$Na_2SO_4$, 0.75 percent by weight
NaCl, 0.12 percent by weight
$Fe_2O_3$, 0.15 percent by weight
$Al_2O_3$, 0.81 percent by weight The products obtained by this process comprise lime soda (plate or window) glass having a surface where the $Na_2O/SiO_2$ ratio is below the $Na_2O/SiO_2$ ratio of the interior, with the conductive tin oxide coating upon such surface. It will be apparent from the above description that the glass product of this invention comprises a lime soda glass base having a transparent intermediate zone, layer of film between the glass base and the transparent metal oxide film. This intermediate film is characterized by the fact that the concentration (if any) of alkali metal present therein is below the concentration of alkali metal in the interior portion of the glass base and may even contain no alkali.

The exact composition of the intermediate layer produced according to this invention is not known and is exceedingly difficult to determine because of the unusual thinness of the film. However, it is believed that the film is composed preponderantly of silicon together with some oxygen and probably comprises silica as such or combined as a silicate. The term "silica" is intended to include transparent film containing silicon and oxygen whether or not the exact composition corresponds to the formula ($SiO_2$) for silica.

The products prepared according to this invention may be used for a wide variety of uses. Viewing closures or windows in vehicles such as aircraft or automobiles or in buildings are particularly valuable when constructed of glass panels provided with a transparent electroconductive coating applied by the presently contemplated process. In such use, the conductive coating is placed in series with an electric circuit and using the film or coating as a heating element for heating the panel. By so heating the panel, formation of ice or fog on the panel is prevented.

Although the present invention has been described with reference to the specific details of certain embodiments thereof, it is not intended that such details shall be regarded as limitations upon the scope of the invention except insofar as included in the accompanying claims.

I claim:

1. A method of providing a substantially haze-free glass base having a transparent electroconductive coating thereon, which comprises heating lime-soda-silica glass having the composition:

| | Percent by weight |
|---|---|
| Alkali metal oxide of the group consisting of $Na_2O$ and $K_2O$. | 10 to 35. |
| Alkaline earth metal oxide of the group consisting of CaO and MgO. | 5 to 25—the CaO content being not less than 5 percent by weight. |
| $SiO_2$ | 50 to 75. |
| $Al_2O_3$ | up to 20. | to a temperature above about 500° F. but below the temperature at which the glass melts, contacting the heated glass with hydrofluosilicic acid and thereafter contacting the glass with a decomposable tin compound while the glass is at a temperature of from about 500 to 1250°

F. whereby to deposit a transparent electroconductive tin oxide coating upon a treated surface of the glass.

2. A method of preparing a transparent electroconductive article which comprises heating a lime-soda-silica glass base to a temperature above about 500° F., but below the temperature at which the glass becomes molten, contacting the heated base with hydrofluosilicic acid and thereafter contacting the glass base with a decomposable tin compound while the base is at a temperature of from 500 to 1250° F.

3. A method of preparing a transparent electroconductive article which comprises heating a lime-soda-silica glass base to a temperature above about 500° F. but below the temperature at which the glass becomes molten, contacting the heated glass with hydrofluosilicic acid and thereafter contacting the glass base with stannic chloride while the base is at a temperature of from about 500 to 1250° F.

4. A method of preparing a transparent electroconductive article which comprises heating a lime-soda-silica glass base to a temperature above about 500° F. but below the temperature at which the glass becomes molten, contacting the heated base with hydrofluosilicic acid and thereafter contacting the glass base with a solution of a decomposable tin compound while the base is at a temperature of from 500 to 1250° F.

5. A method of preparing a transparent electroconductive article which comprises heating a lime-soda-silica glass base to a temperature above about 500° F. but below the temperature at which the glass becomes molten, contacting the heated glass with hydrofluosilicic acid and thereafter contacting the glass base with a solution of stannic chloride while the base is at a temperature of from about 500 to 1250° F.

References Cited in the file of this patent

UNITED STATES PATENTS

| Number | Name | Date |
| --- | --- | --- |
| 2,566,346 | Lytle et al. | Sept. 4, 1951 |

FOREIGN PATENTS

| Number | Country | Date |
| --- | --- | --- |
| 596,346 | Great Britain | Jan. 1, 1948 |